United States Patent [19]

Weil et al.

[11] 4,383,005

[45] May 10, 1983

[54] RUBBER MIXTURES AND VULCANIZATES PRODUCED THEREFROM

[75] Inventors: Joachim Weil; Richard Sattelmeyer, both of Wiesbaden, Fed. Rep. of Germany

[73] Assignee: Hoechst Aktiengesellschaft, Frankfurt am Main, Fed. Rep. of Germany

[21] Appl. No.: 314,887

[22] Filed: Oct. 26, 1981

[30] Foreign Application Priority Data

Nov. 15, 1980 [DE] Fed. Rep. of Germany ....... 3043227

[51] Int. Cl.$^3$ ............................................. B32G 31/00
[52] U.S. Cl. .................... 428/625; 152/359; 152/330 R; 156/110 A; 156/110 MD; 156/124; 523/166; 524/511
[58] Field of Search ............ 152/359, 330 R; 156/110 A, 110 MD, 124, 307.7; 523/166; 524/511; 428/625

[56] References Cited

U.S. PATENT DOCUMENTS

| | | | |
|---|---|---|---|
| 2,240,805 | 5/1941 | Semon | 428/625 |
| 2,813,566 | 11/1957 | Ruggeri et al. | 156/110 MD |
| 3,039,906 | 6/1962 | Baldwin et al. | 156/110 A |
| 3,778,406 | 12/1973 | Klötzer et al. | 156/307.7 |
| 3,998,992 | 12/1976 | Nakamura | 156/124 |
| 4,040,999 | 8/1977 | Kalafus et al. | 156/110 A |
| 4,236,564 | 12/1980 | Kalafus et al. | 156/110 A |
| 4,297,159 | 10/1981 | Dobiae et al. | 156/307.7 |

FOREIGN PATENT DOCUMENTS 2039580  8/1980  United Kingdom ........... 156/110 A

*Primary Examiner*—Veronica O'Keefe
*Attorney, Agent, or Firm*—Hammond & Littell, Weissenberger and Muserlian

[57] ABSTRACT

A rubber composition having an improved adhesion to steel cord comprising
  (a) a rubber vulcanizable with sulfur,
  (b) at least one reinforcing filler containing between 10 and 50% by weight of active silicic acid,
  (c) a vulcanization agent selected from the group consisting of sulfur and a sulfur donor,
  (d) at least one phenol resin derived from at least one mono- or polyhydric phenol and aldehyde, wherein at most 30% of the phenol component consists of a mono-nuclear polyhydric phenol,
  (e) a compound of a metal being capable of having various valencies and
  (f) a methylene donor and a rubber article prepared from said composition.

11 Claims, No Drawings

RUBBER MIXTURES AND VULCANIZATES PRODUCED THEREFROM

A number of rubber mixtures have been described, which are intended to ensure good adhesion of the rubber to steel cord, e.g. of the kind coated with brass or zinc. Thus, in U.S. Pat. No. 4,148,769, a rubber mixture is described based on a rubber, a reinforcing pigment such as silicic acid, sulphur and other ingredients, the essential feature of which is the combination of lead oxide and a cobalt salt of a fatty acid and the use of resorcinol or a pre-condensate thereof, together with a substance which yields free formaldehyde. A similar system is also described in "Kautschuk und Gummi, Kunststoffe," Volume 33 (1980) 1611, but in this system no lead oxide is used. Moreover, in German ALS No. 20 02 023, a conveyor belt with a high resistance to re-heating is described, the rubber embedding compound of which contains silicic acid, resorcinol and a substance of unspecified constitution which yields formaldehyde when heated. According to a preferred embodiment, this rubber embedding compound may also contain cobalt naphthenate or a phenol formaldehyde resin the composition of which is not described in detail, and indeed there is not even any indication as to whether this is a resol or a novolak.

Finally, German ALS No. 24 14 789 describes a rubber composition which consists of natural rubber or certain synthetic rubbers, a compound which yields formaldehyde and a co-condensate of formaldehyde and a mixture of resorcinol and another phenol in a molar ratio of 0.4:1 to 1.3:1 or a mixture of a condensate of resorcinol with formaldehyde in a molar ratio of 0.4:1 to 1.0:1 and the condensate of a phenol with formaldehyde in a molar ratio of 0.5:1 to 1.4:1, the weight ratio of resorcinol to phenol being 95:5 to 50:50, whilst the weight ratio of resorcinol-formaldehyde condensate to the phenol-formaldehyde condensate is 95:5 to 50:50. However, this specification makes no mention of the co-use of a cobalt salt.

When the known compounds contain resorcinol, they have the major disadvantage that considerable fuming occurs when the resorcinol is incorporated in the mixture, since it has to be incorporated at relatively high temperatures and the resorcinol thereby escapes to a large extent into the atmosphere. This is undesirable, owing to the toxic properties of resorcinol. This disadvantage is indeed avoided with the known proposals which use condensates of resorcinol with aldehydes, but the use of such condensates is undesirable for economic reasons, owing to the relatively high cost of resorcinol.

In the invention, these disadvantages are now overcome. At the same time, rubber mixtures are provided which, in addition to having good mechanical properties and very good adhesion to steel cord, have the excellent property of continuing to adhere in this way not only after dry treatment but—and this is particularly important—even after intensive wetting at fairly high temperatures. In this respect they are already clearly superior to the majority of the known systems.

The invention thus relates to rubber mixtures having improved qualities of adhesion to steel cord, based on (a) a rubber which is vulcanisable with sulphur, (b) reinforcing fillers, (c) sulphur as a vulcanising agent, (d) a phenolic resin, (e) a compound of a metal, which may exhibit various valencies, (f) a methylene donor, and (g) optionally other conventional additives, characterised in that the component (b) contains 10 to 50, preferably 15 to 40 wt % of active silicic acid and component (d) consists of the resin of a mono- or polyvalent phenol with aldehydes, preferably formaldehyde, in which not more than 30 percent of the phenol component consists of a mononuclear polyvalent phenol.

Rubber mixtures according to the invention thus contain in addition to the conventional additives, as a reinforcing filler, a quantity of silicic acid, a phenolic resin (and not a resorcinol resin), a metal salt and a methylene donor, the latter advantageously in the form of a reactive melamine resin.

Suitable types of rubber include, for example, natural rubber, polyisoprene, polybutadiene, styrene rubber, acrylonitrile rubber, butyl rubber, ethylenepropylene-diene terpolymer rubber or mixtures thereof, such as are conventionally used in the tire industry or for the manufacture of industrial rubber goods.

Fillers which may be used, apart from active silicic acid, include the standard known carbon blacks and white fillers such as non-active silicic acids, kaolins and chalk. The term "fillers" also covers pigments of an inorganic or organic nature, such as titanium dioxide, iron oxide and the like. The active silicic acid used according to the invention refers to those types which have a high specific surface area according to Brunauer, Emmett and Teller, Journ. Am. Chem. Soc. 60 (1938) 309, of over 150 $m^2/g$. Such products have, for example, a density of about 2 $g/cm^3$ and a pH value of 5-7. Standard commercially available types include, for example, Vulkasil S made by Bayer AG of Leverkusen and Ultrasil VN 3 made by Degussa of Frankfurt am Main. The total quantity of filler is generally 30-150, preferably 50-100 parts by weight and that of silicic acid generally 5-35, preferably 10-30 parts by weight per 100 parts by weight of rubber.

For vulcanisation, sulphur as such is generally used, together with the known accelerators. However, in some cases, elemental sulphur may be used wholly or partly in the form of sulphur-yielding compounds such as thiuram sulphides. However, vulcanisation with sulphur is preferred. The course of vulcanisation can be adapted to suit the practical requirements by a suitable choice of accelerators.

The preferred phenolic resins are novolaks, although resols are theoretically suitable. Suitable resins include, for example, resins obtained from phenol, polyvalent polynuclear phenols, such as bisphenols, e.g. diphenylolpropane or diphenylolmethane, or mixtures of phenol and alkylphenols, such as t-butylphenol, octylphenol or nonylphenol and aldehydes, preferably formaldehyde. In the novolaks, the molar ratio of the phenol to the aldehyde is generally within the range from 1:0.6 to 1:0.9. The resins may also contain plasticising components such as polyethylene glycols, colophony, tall oil or other suitable plasticisers such as vegetable oils, or they may be modified with natural resinic acids or olefinically unsaturated hydrocarbons, such as styrene. In theory, phenolic resins wherein the phenol component consists exclusively of alkylphenols having an alkyl group with 1-12 carbon atoms may also be used. However, phenol resins based on alkylphenols with an alkyl group having 2-12 carbon atoms are of only limited use, since they are less curable. Moreover, the phenolic resins may contain added amounts of phenylphenol or phenols containing several alkyl groups. It is also possible, though less preferably, to modify the resins by replacing up to 30% of the phenol component by a mononuclear polyhydric phenol, particularly resorcinol, but possibly also pyrocatechol or pyrogallol. For practical use, novolaks based on the phenol $C_6H_5OH$ may be used, in particular, but it is also possible to use novolak resins made up of phenol and mixtures of phenol and cashew nutshell oil and those made up of phenol and alkylphenols with 4-12 carbon atoms in the alkyl moiety, particularly p-tert.-butyl-, octyl- or nonylphenol. The proportion of substituted phenols in the novolak may vary, but the novolak should still be curable. Thus, a proportion of alkylphenol of not more than 70 mol-% of the total phenol component will generally be selected.

The proportion of phenolic resin is generally 0.5–20, preferably 1–10 wt. -%, based on the rubber. In individual cases, larger amounts, e.g. 50 wt. -% based on the rubber may also be used. With such a high novolak content, hard products are obtained which differ substantially from the conventional highly elastic rubber vulcanisates in their properties.

Examples of metal compounds includes salts, e.g. salts of manganese, vanadium, lead, iron, nickel, selenium, tellurium and, in particular, cobalt, these metals preferably being organically bound, e.g. as chelates, or bound to compounds containing carboxyl groups, particularly saturated or unsaturated fatty acids and naphthenic acids. For example, the octoates, laurates, stearates, palmitates and linoleates may be used. Appropriately, these metal salts are used in the form of the standard commercial preparations with a relatively high metal content, e.g. cobalt preparations containing 5–16% metal, iron naphthenate containing 7–8% metal, nickel octoate containing 15% metal, lead naphthenate containing 30% metal or lead octoate containing 38–40% metal, but primarily with low solvent contents. Apart from salts, it is also possible to use oxides in individual cases. The metal content, based on the rubber, is appropriately 0.05–1, preferably 0.08–0.8 wt. -%. In individual cases, however, it may be outside this range.

Methylene donors, apart from hexamethylenetetramine, include aminoplast-forming compounds containing hydroxyl groups.

Examples include melamine resins such as may be obtained by reacting melamine with 0.5–6 mol of aldehyde, preferably formaldehyde. Preferred compounds are hexamethoxymethyl melamine or corresponding higher condensed polynuclear products or at least partially etherified trimethylol, tetramethylol or pentamethylol melamine resins. The degree of condensation of all aldehyde, particularly formaldehyde resins and their content of free alkylol, particularly methylol groups, can be regulated in the usual way by suitable adjustment of the reaction medium.

Other suitable compounds include, for example, polymethylol ureas, mixed condensates of melamine, urea or other aminoplast-forming compounds and formaldehyde, and products obtained by reacting melamine with more than 6 mol, e.g. 8 mol of aldehyde, preferably formaldehyde, or the ethers, preferably methyl ethers of all these products. Thus, for example, other suitable products are those wherein more than 1 mol of formaldehyde is added onto some of the NH bonds of the melamine, and the nonetherified or etherified methylol compounds of the available guanamines, such as aceto-, benzo- or formoguanamine. A product of this kind is, for example, tetramethoxymethylbenzoguanamine, which occurs in solid form. Other suitable products are those obtained by reacting urea with 2–4 mol of formaldehyde.

With respect to the compatability with rubber, the particularly preferred compounds are those wherein the methylol groups are at least partially etherified by reacting with monohydric alcohols with 1–12, preferably 1–8 carbon atoms, such as methanol, ethanol, the various propanols and butanols, ethylhexyl alcohol, n-octanol, nonanol and dodecyl alcohol. If the liquid form in which these resins are supplied is not the optimum form for use, the resins may be taken up by absorption on suitable solid carrier materials with active substance contents of up to 75% and thus be used as pourable products.

The mixtures according to the invention may be prepared in the usual way in internal mixers or an mixing rollers. When the resins are incorporated, care must be taken to ensure that the temperature during any phase of the preparation of the mixture is above the melting point of any fusible components, particularly the novolak resins, to ensure that these components can be fully distributed. It is also important that the methylene donor should be incorporated in such a way as to prevent premature inherent condensation or premature reaction with the novolak which is to be cured. This is possible if the methylene donor by incorporated at the end of the mixing operation, at temperatures which are not excessively high. The temperature depends on the particular methylene donor used, the novolak and the time and is generally 80°–120° C., preferably above 100° C.; in individual cases it may be higher or lower.

The optimum quantities of methylene donor required to cure the phenolic resins have to be determined, in principle, in preliminary tests which are easily carried out. Generally, about 1–80, preferably 2–50 wt. -% of methylene donor are required to 100 parts by weight of phenolic resin.

It is also possible to add plasticizers, of the type conventionally used in rubber processing, for example aromatic, naphthene or paraffin oils, aromatic polyethers, phthalic acid esters or the like.

Conventional additives include takifying resins, stearic acid, zinc oxide, anti-ageing agents and the like.

As the steel cord, it is possible to use one which is coated with zinc; however, it is preferably coated with brass.

Industrial rubber goods may be made from the mixtures according to the invention; however, these mixtures may also be used for the production of vehicle tires. In the example which follows, GT=parts by weight.

EXAMPLE

A basic mixture having the following composition is prepared:
70 GT Natural rubber
30—Cis-polybutadiene
45—Highly reactive reinforcing carbon black
5—Aromatic oil
15—Active silicic acid
2—Tackifying resin[1]
5—Zinc oxide
1—Stearic acid
2.5—Anti-ageing agent
4.0—Sulphur
0.7—Benzothiazyl-2-dicyclohexylsulfenamide
(1) Standard commercial alkylphenol novolak, mp 70°–75° C. (Capillary method according DIN 53181).

Individual batches are taken from this uniform basic mixture and the additives listed in Table 1 below are added, based on the proportions of the components specified therein, these additives being incorporated by the method described hereinbefore.

Mixture 1 describes the composition according to the invention, whilst V2-V5 are comparison mixtures according to the prior art. As the novolak, a standard commercial condensation product of phenol with formaldehyde was used and, as the methylene donor, a hexamethoxymethylmelamine (HMMM), a product brought into pourable form by adsorption on silicic acid containing 70% of organic substance. The resorcinol resin used in comparison text V5 was obtained by condensation of resorcinol with formaldehyde; the phenol novolak is commercially available and is produced from phenol and formaldehyde in a molar ratio of 1:(0.7–0.8), whilst the melting point according to DIN 53181 (capillary method) is in the range from 80°–100° C. Each of mixture 1 and V2 to V5 is combined with the above basic mixture in such an amount that each mixture of the table is referred to a total of 100 GT of elastomers.

With all these mixtures, the mechanical properties such as strength, expansion, stress values at 50% and 200% expansion and the Shore hardness A were determined using the normal text methods. An assessment of these results shows that, as far as mechanical properties are concerned, mixture 1 and comparison V2 have advantages as regards the high hardness and stress values with low expansion obtained. However, the results of the adhesion tests, which were carried out as follows, are more important. In a test arrangement in accordance with the recommendations of the Standards Committee entitled ISO DP 5603.3 of TC 45 form the International Standards Organisation ISO, steel cord with the structure 4×0.24 having a 67% copper content in the brass coating was embedded in the adhesive mixtures. After vulcanisation under the conditions specified, the testpieces were stored under different conditions and then the adhesion to steel cord was measured. From ten individual tests, the average value of the force needed to pull the cord out of the vulcanisate was determined and in addition the degree of covering was evaluated subjectively, the surface area of the pulled out cord covered with rubber being evaluated in 10% graduations (i.e. graduation 1,2,3 ... 10 represent 10,20,30 ... 100% covered cord surface).

TABLE I

Comparison of the adhesive mixtures

| | Invention Mixture 1 | Comparison Examples | | | |
|---|---|---|---|---|---|
| | | V2 | V3 | V4 | V5 |
| | 4 GT Phenolnovolak | 2.5 GT Resorcinol | 2.5 GT Resorcinol | 1 GT of Co— naphthenate/ 11% Co | 3 GT of Resorcinol resin |
| | 1 GT Co—naphthenate/11% Co | 2.5 GT Hexamethylenetetramine | 3.0 GT of 70% HMMM | | 2.5 GT of 70% HMMM |
| | 2.47 GT of 70% HMMM on SiO$_2$ | 45'/145° C. | | | |
| Vulcanisation conditions | 40'/155° C. | 45'/145° C. | 45'/145° C. | 60'/155° C. | 60'/155° C. |
| Test values: | | | | | |
| Strength (MPa) | 16.3 | 22.9 | 19.8 | 18.0 | 18.9 |
| Expansion (%) | 423 | 364 | 558 | 328 | 457 |
| Stress at expansions of  50% | 1.3 | 2.1 | 0.8 | 1.3 | 1.2 |
| Stress at expansions of  200% | 5.8 | 10.4 | 3.7 | 7.1 | 5.0 |
| Shore hardness A | 72 | 74 | 62 | 70 | 68 |
| Steel Cord adhesion/ degree of covering | | | | | |
| 3d  23° C.  50% rF(Ncm$^{-1}$) | 334/10 | 360/10 | 324/8 | 355/10 | 375/10 |
| 2d  120° C.       F(Ncm$^{-1}$) | 268/9 | 317/10 | 313/8 | 283/10 | 289/10 |
| 3d  80° C.  100% F(Ncm$^{-1}$) | 357/10 | 79/1 | 324/5 | 302/9 | 252/7 |
| 7d  80° C.  100% F(Ncm$^{-1}$) | 323/10 | 72/1 | 146/3 | 217/5 | 156/4 |
| 14d 80° C. 100% F(Ncm$^{-1}$) | 178/3 | 59/1 | 89/1 | 184/4 | 153/3 | rF = relative humidity
d = days

The test results with regard to the adhesion and the degree of covering show that the mixture 1 according to the invention has better adhesion and a better degree of covering than all the comparison examples, under the conditions of increased corrosion during storage in a hot, moist atmosphere (80° C., 100% relative humidity). Thus, with the rubber mixture according to the invention, it is possible to find solutions to the problem of achieving good adhesion of rubber to steel cord, which are technically more advantageous, by the use of physiologically safer and environmentally more acceptable resin components.

What we claim is:

1. A rubber composition having an improved adhesion to steel cord comprising
   (a) a rubber vulcanisable with sulfur,
   (b) at least one reinforcing filler containing between 10 and 50% by weight of active silicic acid,
   (c) a vulcanisation agent selected from the group consisting of sulfur and a sulfur donor,
   (d) at least one phenol resin derived from at least one monovalent phenol or polyvalent polynuclear phenol or polynuclear phenol and aldehyde,
   (e) a compound of a metal being capable of having various valencies and
   (f) a methylene donor.

2. A composition as claimed in claim 1, wherein the amount of silicic acid is between 15 and 40% by weight, referred to the total of component (b).

3. A composition as claimed in claim 1, wherein the total of filler is between 30 and 150% by weight and that of silicic acid is between 5 and 35% by weight, each referred to the weight of the rubber (a).

4. A composition as claimed in claim 1, wherein the phenol resin (d) is a novolak selected from the group consisting of a type based on formaldehyde and phenol and a type based on formaldehyde and a phenol mixture containing an amount of at most 70 mol-% of alkylphenol having between 4 and 12 carbon atoms in the alkyl radical, and wherein the molar ratio of the phenol component to the formaldehyde is from 1:0.6 to 1:0.9.

5. A composition as claimed in claim 1, wherein component (e) is a cobalt salt of a saturated or unsaturated carboxylic acid.

6. A composition as claimed in claim 1, wherein component (f) is a reactive melamine resin obtained by reaction of one mol of melamine with between 0.5 and 6 mols of formaldehyde which resin is unetherified or the methylol groups of which are at least partially etherified with a monohydric alcohol having between 1 and 12 carbon atoms.

7. A composition as claimed in claim 1, wherein the amount of the phenol resin (d) is between 0.5 and 20% by weight, referred to the rubber, the metal content of component (e) is between 0.05 and 1% by weight, referred to 100 parts by weight of rubber and the amount of methylene donor (e) is between 2 and 50% by weight, referred to the phenol resin.

8. A composition as claimed in claim 1 comprising
(a) a rubber vulcanisable with sulfur
(b) at least one reinforcing filler containing between 10 and 50% by weight of active silicic acid,
(c) a vulcanisation agent selected from the group consisting of sulfur and a sulfur donor,
(d) at least one phenol resin derived from at least one monovalent phenol or polyvalent polynuclear phenol or polynuclear phenol and aldehyde,
(e) a compound of a metal being capable of having various valencies and
(f) a methylene donor, wherein the total of filler is between 30 and 150% by weight, referred to the weight of rubber (a), and the phenol resin (d) being a novolak selected from the group consisting of a type based on formaldehyde and phenol and a type based on formaldehyde and a phenol mixture containing an amount of at most 70 mol-% of alkylphenol having between 4 and 12 carbon atoms in the alkyl radical and the molar ratio of the phenol component to the formaldehyde being from 1:0.6 to 1:0.9, component (e) being a cobalt salt of a saturated or unsaturated carboxylic acid, and component (f) being a reactive melamine resin obtained by reaction of one mol of melamine with between 0.5 and 6 mols of formaldehyde which resin is unetherified or the methylol groups of which are at least partially etherified with a monohydric alcohol having between 1 and 12 carbon atoms.

9. A composition as claimed in claim 1 which has been prepared in at least one phase at a temperature above the melting point of the fusible components.

10. A rubber article prepared by vulcanisation of a rubber composition as claimed in claim 1 in contact with steel cord.

11. An article as claimed in claim 10 in contact with steel cord coated with brass.

* * * * *